United States Patent

[11] 3,587,014

| [72] | Inventor | Julius Nador<br>Ingleside, Ill. |
|---|---|---|
| [21] | Appl. No. | 2,549 |
| [22] | Filed | Jan. 13, 1970 |
| [45] | Patented | June 22, 1971 |
| [73] | Assignee | Pneumo Dynamics Corporation<br>Cleveland, Ohio |

[54] POSITIONING DEVICE FOR INSTRUMENT ASSEMBLY
9 Claims, 4 Drawing Figs.

[52] U.S. Cl. .................................................. 335/222, 324/151
[51] Int. Cl. .................................................. H01f 7/08
[50] Field of Search ....................................... 335/222; 324/151

[56] References Cited
UNITED STATES PATENTS
2,808,567 10/1957 Lederer .................. 324/151

| 2,875,410 | 2/1959 | Lamb .......................... | 335/222 X |
| 3,252,092 | 5/1966 | Stahly et al. ................ | 324/151 |

FOREIGN PATENTS
| 731,760 | 6/1955 | Great Britain ............... | 335/222 |

*Primary Examiner*—G. Harris
*Attorney*—Stephen M. Mihaly

ABSTRACT: A magnet-positioning device by which a cylindrical core magnet is accurately centered and securely held within an electrical instrument casing. The device includes a hollow bracket having inwardly projecting tabs on the sides thereof which provide a seat for the core magnet. An end of the magnet supports a circular plate which has a pair of notches at opposite points in the edge thereof. These notches are engaged by a pair of aligned centering screws which penetrate the bracket sides at an elevation removed from the inwardly projecting tabs. The screws cam the core magnet against the seat tabs and axially align the core magnet within the bracket and thus within the instrument casing.

PATENTED JUN 22 1971

3,587,014

INVENTOR.
JULIUS NADOR
BY
Stephen M. Mihaly
ATTORNEY

POSITIONING DEVICE FOR INSTRUMENT ASSEMBLY

The present invention relates to improvements in an electrical instrument assembly, and in particular, to a novel positioning device for centering and holding a core magnet within an instrument casing.

The present invention is particularly applicable to electric current or voltage meters of the core magnet or iron core type, and will be described with particular reference thereto, although it will be appreciated that the invention has other applications.

Core magnet types of meters are well known. However, the core magnets are held in a two-piece or one-piece bracket by means of friction, and generally no provision is made for centering the magnet, or securing it against displacement after assembly when the meter is exposed to vibration or shock.

Accordingly, it is an object of the present invention to provide a device for positioning a core magnet within an instrument casing, and for securely holding the magnet against displacement from shock and vibration.

It is also an object of the present invention to provide a simpler and less expensive positioning means for core magnets.

It is further an object of the present invention to provide a means for locating and securely holding a core magnet which avoids the possibility of injury to the magnet.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Figure 1:
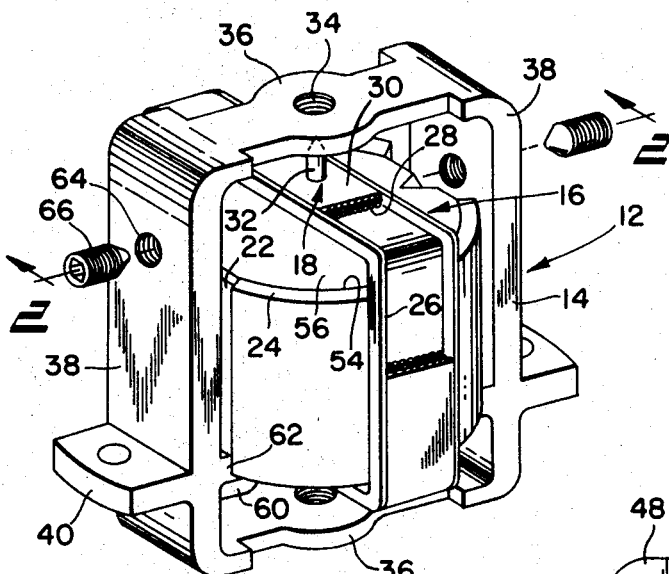
FIG. 1 is a perspective view of a core magnet and bracket assembly in accordance with the concepts of the present invention.
Figure 3:
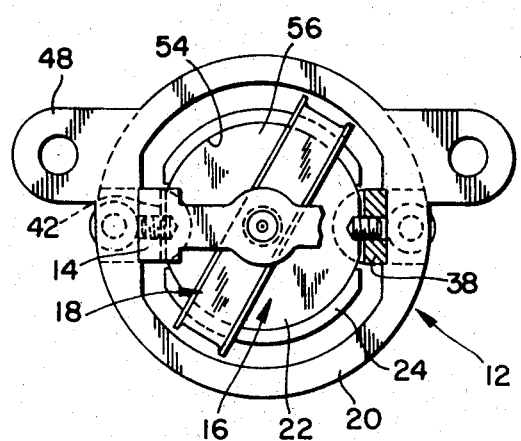
FIG. 3 is a reduced plan view taken along line 3-3 of FIG. 2.
Figure 2:
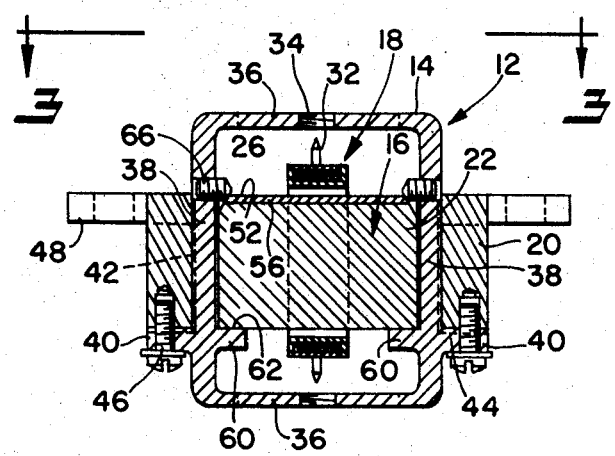
FIG. 2 is a reduced section view taken along line 2-2 of FIG. 1 further illustrating an outer cylindrical ring in which the bracket of FIG. 1 is seated.

Referring to the drawing, and in particular FIG. 1, the positioning device 12 comprises an annular rectangular bracket 14 which encompasses a core magnet assembly 16. A coil winding 18 is movable around the core magnet assembly 16. The device 12 is contained within and supported by an outer cylindrical ring 20 (FIGS. 2 and 3) which in turn is secured within an instrument casing (not shown).

The device in accordance with the present invention is particularly suitable for use in a D'Arsonval-type meter for the measurement of current and voltage. In such a meter, the coil winding is pivotally supported along the axis of the meter on jeweled support bearings (not shown in the drawing) which exactly align the winding within the meter casing. It is also desired to support and hold the core magnet so that its magnetization axis is exactly centered and aligned with the axis of the meter.

Figure 4:
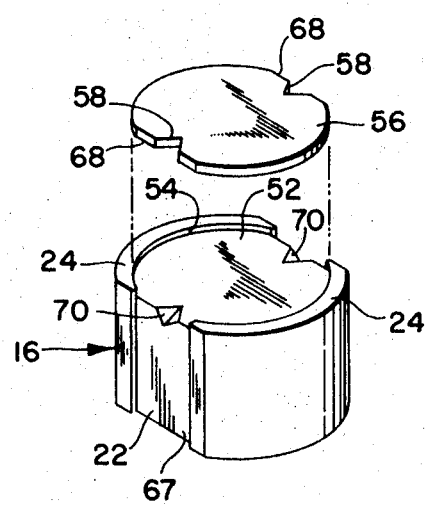
FIG. 4 is a partial, exploded view of a magnet assembly in accordance with the invention.

The magnet assembly 16 is shown clearly in FIG. 4, and comprises a generally cylindrical core magnet 22 which is molded from a highly coercive magnetic material such as Alnico (an alloy which contains aluminum, nickel and cobalt). A pair of semicylindrical pole shoes 24 of soft magnetic material encompass and are secured to the opposite curved surfaces of the core magnet. These pole shoes may be fastened to the magnet body by any suitable means, such as by soldering or cementing.

The coil winding 18 comprises a rectangular channel piece 26 on which are wound layers of wire 28 protected by cover 30. Opposite ends of the coil are provided with bearing pins 32. These pins are axially aligned, and seat into jeweled spaced bearing assemblies (not shown) threaded into holes 34 in opposite ends 36 of the bracket 14. By means of the jeweled bearings, the coil pivots or rotates around the core magnet assembly.

The bracket 14 is a single piece, rectangular member which in addition to ends 36 has flattened sides 38 which are bridged by the ends 36. The bracket is of a nonmagnetic material, and on each of the opposite sides thereof is provided with an outstanding lug 40 extending generally at right angles to the side.

The outer cylindrical ring 20 (FIGS. 2 and 3) is adapted to contain or house the bracket 14. This is accomplished by providing the ring inner surface with a pair of axially extending diametrically opposed grooves 42 which are parallel to each other. These grooves are flattened along the inner surfaces thereof, and receive the sides 38 of the bracket. The lugs 40 of the bracket abut against a face 44 of the ring, and the bracket and ring are secured together by means of screws 46 threaded into the ring face 44. External mounting tabs 48 on the outside of the ring adjacent the face of the ring opposite face 44 provide a means for securing the ring within a casing (not shown) of the meter.

In accordance with the invention, the oppositely facing pole shoes 24 of the magnet assembly are dimensioned to extend above the upper flat surface 52 of the cylindrical core magnet 22, as shown in FIG. 4, to form with the surface 52 a circular shallow nest 54. A relatively thin, near circular, aluminum disc 56 is placed in the nest. The disc is substantially the same diameter as the diameter of the nest, but is free to rotate within the nest. Opposite sides of the disc, in the edge thereof, are provided with V-shaped notches 58 pointed towards the center of the disc.

The opposite sides 38 of the bracket are provided with inwardly projecting tabs 60, which provide generally flattened surfaces or seats 62 parallel to the ends 36 of the bracket. The sides of the bracket are also provided with aligned tapped holes 64 at an elevation spaced from the tabs 60. A pair of cone point setscrews 66 are threaded into the tapped holes.

In the illustration of FIG. 4, the magnet 22 is shown as having narrow flattened surfaces 67 on opposite sides thereof between the curved surfaces which support the pole shoes 24. To insert the magnet assembly 16 within the bracket 14, the assembly is rotated so that the flattened sides 67 are parallel with the sides 38 of the bracket. The flat disc 56 is also rotated in the nest 54 to expose the notches 58, and then with the movable coil winding 18 in position embracing the assembly, the assembly is slid into the bracket and seated against the bracket tabs 60. Following this, the cone point setscrews are turned and advanced inwardly to engage the notches. This not only secures the magnet assembly against axial misalignment, but also cams the body of the magnet against the tabs 60 of the bracket to hold the magnet assembly securely and axially within the bracket. Thus, the pressure on the disc applied by the setscrews prevents any vertical or lateral motion of the magnet assembly on account of vibration or shock. For the purpose of inserting the magnet assembly 16 within the bracket 14, the disc 56 is also flattened at edge points 68 containing notches 58 so that the configuration of the disc corresponds with the cross section of the magnet 22.

Following assembly of the core magnet and coil winding within the bracket 14, the latter is then slid into grooves 42 of the cylindrical ring 20 until the laterally extending lugs 40 of the bracket engage face 44 of the ring 20. Subsequently the ring is secured within the meter casing by means of lugs 48.

The axial position of the magnet assembly within the bracket is established by adjustment of the cone point setscrews, by means of a gauge, or simply by means of sight. Using either method, the magnet assembly is accurately centered so that when the ring 20 is secured within the meter casing the magnetization axis of the magnet is aligned with the axis of the instrument. The magnetization axis of the magnet assembly is also aligned with the pivot axis of the movable coil winding 18.

In operation, the movable coil winding 18 turns in the annular space between the centered magnet assembly and the encircling cylindrical ring of soft iron, with the latter fully shielding the permanent magnet.

During molding of the core magnet body, two opposed notches 70 (FIG. 4) are molded into the top face of the magnet, or along the top edges of surfaces 67 of the magnet. The purpose of these notches is to provide clearance of the magnet with the setscrews 66 when the latter are threaded into engagement with the aluminum disc 56. By this means, damage to the magnet body by the setscrews is avoided.

Instead of using V-shaped notches in the edge of the disc 56, and tapered setscrews, it is apparent that other configurations can be used, such as oval-shaped setscrews and notches.

For purposes of the present application, the magnet 22 and disc 56 have been described as cylindrical and circular in configuration. This shall be deemed to include the near cylindrical and near circular configurations shown in the drawing.

Among advantages of the invention, one is a high degree of accuracy or precision of measurement which is obtained. In addition the simplicity and ease of assembly of the device should be apparent. Further, the magnet is securely held against displacement from shock or vibration, and this is accomplished in a manner which avoids injury to the magnet.

The embodiments of the invention in which I claim an exclusive property or privilege are defined as follows:

1. A positioning device for cylindrical core magnets, the device including a hollow bracket, the improvement comprising,
   seating means on the inside of the bracket against which the core magnet is seated,
   a disc retained against an end of the core magnet opposite the seated end,
   a plurality of indentations in said disc in the edge thereof, and
   holding means penetrating sides of said bracket engaging said indentations,
   said indentations and holding means having complementary surfaces camming said magnet against the bracket seating means.

2. A device for positioning a cylindrical core magnet in an instrument casing wherein the magnet is held within a hollow bracket, the improvement comprising
   internal seating means in the bracket,
   a pair of aligned setscrews penetrating the bracket sides at an elevation spaced from the seating means,
   circular disc means retained against one end of the core magnet opposite the end seated against said seating means,
   a pair of opposed indentations in the circular edge of said disc means engageable by said setscrews,
   the setscrews and indentations having complementary surfaces by which said core magnet is cammed against the seating means.

3. The device according to claim 2 wherein the core magnet is provided on opposite curved sides thereof with a pair of semicylindrical pole shoes, the pole shoes extending above said one end of the magnet to form a circular nest, said disc means being contained within said nest but freely rotatable therein.

4. The device of claim 3 wherein the disc means has substantially the same diameter as the nest.

5. The device of claim 3 wherein the core magnet is molded with a pair of aligned and opposed notches in the edge of said one end alignable with the indentations in said disc means to avoid interference of the setscrews with the magnet.

6. The device of claim 4 in which each setscrew has a conical end, the indentations being V-notches, the apex of each notch being pointed toward the center of the disc means.

7. An instrument assembly including a cylindrical core magnet, a substantially rectangular hollow bracket in which the magnet is held, the bracket including a pair of internally extending shoulder portions on the sides thereof constituting a seating means for the core magnet, the bracket further including a pair of externally extending lugs, and an outer cylindrical ring in which the bracket is held by means of said lugs, the improvement comprising
   a pair of aligned cone setscrews penetrating the bracket sides at an elevation spaced from the seating means,
   disc means retained on one end of the core magnet opposite the end seated against said seating means,
   a pair of opposed indentations in said disc means engageable by said setscrews, the setscrews and indentations having complementary surfaces by which the core magnet is cammed against said seating means.

8. The device of claim 7 wherein said notches are V-notches, the apex of each notch being pointed towards the center of the disc means.

9. The device of claim 7 in which said outer cylindrical ring is provided with a pair of diametrically opposed axially extending inner slots, said bracket means being positionable in said slots.